Figure 2:
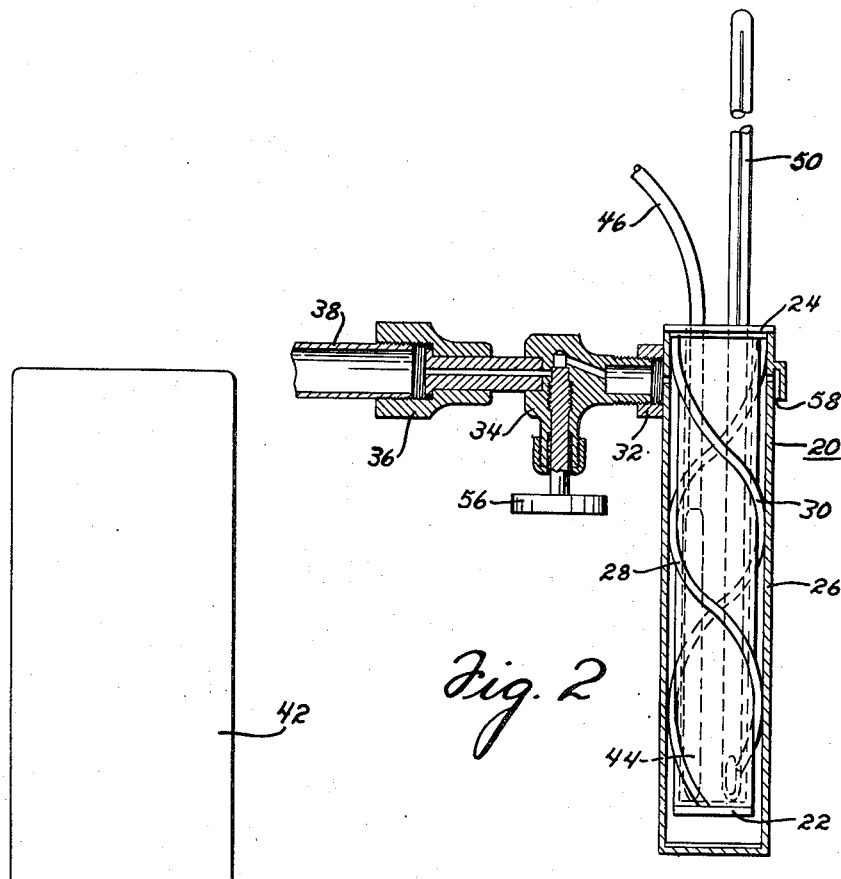

May 8, 1951  L. S. COOPER  2,552,087
APPARATUS FOR TESTING THERMOSTATIC CONTROLS
Filed Sept. 21, 1945

INVENTOR.
Longo S. Cooper
BY
Spencer Hardman and Fehr
Attorneys

Patented May 8, 1951

2,552,087

UNITED STATES PATENT OFFICE 2,552,087

APPARATUS FOR TESTING THERMOSTATIC CONTROLS

Lonzo S. Cooper, Piqua, Ohio, assignor to General Motors Corporation, Dayton, Ohio, a corporation of Delaware Application September 21, 1945, Serial No. 617,803

2 Claims. (Cl. 73—1)

This invention relates to refrigerating apparatus and more particularly to means for cooling and measuring the temperature of thermostatic elements of refrigeration controls and other apparatus.

Refrigeration controls, especially switches and valves, sometimes lose their calibration or fail to operate properly. Often refrigerating systems will operate improperly and the cause may be difficult to determine. In determining the cause it is often important to know whether the switch or the valve is operating properly at the proper temperatures. When it is found that the switch or valve is operating properly obviously it is necessary to look elsewhere for the trouble.

It is an object of my invention to provide a simple, convenient, accurate and portable apparatus for testing the operation and calibration of controls having thermostatic elements which is relatively easy to operate and obtain accurate results.

It is another object of my invention to provide an apparatus for testing the operation and calibration of controls which requires a minimum of refrigerant for changing its temperature.

It is another object of my invention to provide an apparatus for testing the operation and calibration of controls having thermostatic elements which makes use of the tools and gauges ordinarily carried by servicemen.

To attain these objects I provide a well into which is inserted the thermostatic element of the control as well as a suitable thermometer. This well may be filled with a non-freezing liquid such as alcohol to provide good heat transfer. The well is received within a cooling chamber which is cooled by refrigerant taken from a small refrigerant service cylinder ordinarily carried by servicemen.

In use the refrigerant is allowed to flow through the cooling chamber slowly until the thermostatic element is cooled to the point at which the switch opens. This can usually be ascertained by the click due to the snap action opening. At the same time, the thermometer is read indicating the opening temperature of the switch or valve. The refrigerant is then shut off and the apparatus is allowed to warm up until the switch again closes and a thermometer reading is immediately taken to determine the switch closing point.

Further objects and advantages of the present invention will be apparent from the following description, reference being had to the accompanying drawings, wherein a preferred form of the present invention is clearly shown.

Figure 1:
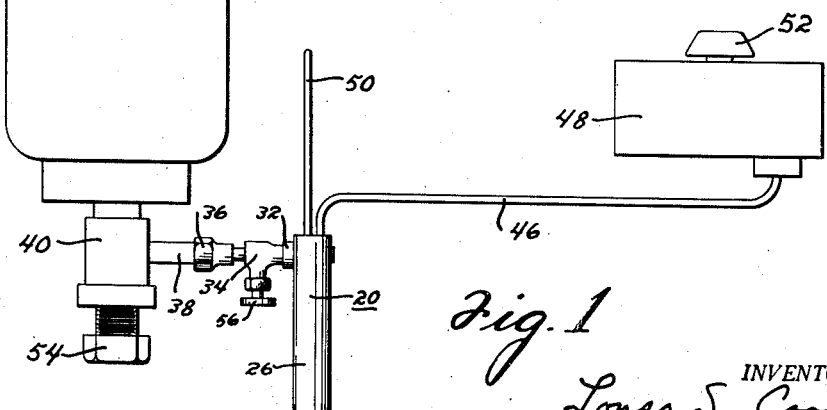

In the drawings:

Fig. 1 is a view of my testing apparatus connected to a refrigerant service cylinder and in use for testing a refrigerator switch; and Fig. 2 is a vertical sectional view through the testing apparatus proper.

Referring now to the drawings, there is shown the testing apparatus 20 including an inner cylinder 22 closed at its lower end and open at its upper end. The upper end is provided with an external flange 24 which fits on top of the open upper end of the outer cylinder 26 likewise closed at its lower end. The outer cylinder 26 is slightly larger in diameter and longer than the inner cylinder 22, providing a cooling space surrounding the inner cylinder 22. Preferably fastened to the outside of the inner cylinder 22 are the helical dividing ribs 28 and 30 positioned at 180 degrees from each other throughout and extending from the flange 24 to the bottom of the cylinder 22. These ribs 28 and 30 fit tightly between the outer wall of the cylinder 22 and the inner wall of the outer cylinder 26 to divide the cooling space into downward and upwardly helical passages.

The outer cylinder 26 is provided with an aperture and a threaded connection 32 with the hand valve 34 which connects through a detachable threaded connection 36 and the tubes 38 with the outlet 40 of the small service cylinder 42 which preferably contains a non-toxic refrigerant, such as difluorodichloromethane under a pressure sufficiently high to keep its greater portion in a liquid state.

To use the apparatus, a thermostat bulb 44 connected by a capillary tube 46 to a refrigerator control 48, such as a switch, is inserted into the well formed by the inner cylinder 22. This well is preferably substantially filled with a non-freezing liquid, such as alcohol. Also inserted in the well formed by the cylinder 22, is a thermometer 50 of the mercury or alcohol type. The adjustment knob 52 is set to the setting used for calibration. The cylinder 42 is opened by partially unscrewing the screw 54 at one end thereof. This allows liquid refrigerant to flow to the valve 34 and by using the handle 56, this valve is opened until there is a highly throttled flow of refrigerant into the cooling chamber located between the inner and outer cylinders 22 and 26.

The liquid refrigerant evaporates in this cooling chamber and is caused to flow spirally downwardly through one of the passages provided by the helical dividing ribs 28 and 30 until it gets to the bottom of the cooling space, after which it passes upwardly on the opposite side of the cylinders in a spiral fashion until it reaches the outlet 58 at the side of the outer cylinder 26 directly opposite the threaded connection 32. This provides substantially uniform refrigeration for the inner cylinder 22, and the thermostat bulb 44 is gradually cooled until the control 48 reaches the operating or opening point. Since the cooling space directly surrounds the well it is efficiently cooled and only about two ounces of refrigerant are ordinarily required for bringing a standard control to tripping temperature.

The movement of the switch or valve from one position to another is usually accompanied by a click. When this is heard, the thermometer 50 can then be read to determine the opening point. The alcohol in the inner cylinder 22 keeps the bulb 44 and the thermometer 50 substantially at the same temperature. The valve 34 is then closed and the inner and outer cylinders are allowed to warm up. They will ordinarily warm up fast enough that no special means will be required to do this. However, if it is desired to increase the rate of warm-up the well assembly can be gripped in the hand or placed in a cup of water. When the thermostat bulb 44 is warmed up to the switch opening or control operating temperature, the click or operating sound will again be heard and the temperature of the thermometer 50 should be read at that time.

In this way both operating points of the control can be accurately and readily determined to ascertain whether the switch is properly calibrated. The switch may then be adjusted and tested and thence repeated until the switch is restored to proper calibration. Otherwise a new control may be substituted. This apparatus makes it possible to test the refrigerator controls by unfastening only the thermostat bulb and a portion of the capillary tubing connected thereto. Thereby refrigerator troubles may be more quickly and more accurately ascertained at a considerable saving in time and labor.

While the form of embodiment of the invention as herein disclosed, constitutes a preferred form, it is to be understood that other forms might be adopted, as may come within the scope of the claims which follow.

What is claimed is as follows:

1. A testing device including a first hollow tube having a lower end adapted to receive a thermostatic element and a temperature measuring device, a second hollow tube having a lower end surrounding but spaced from the first tube to form a cooling chamber therebetween, one of said tubes being provided with a pair of helically extending dividing members extending substantially from the top to the bottom thereof, said helically extending dividing members being located within said cooling chamber and being raised from said one cylinder throughout the greater portion of their lengths sufficiently to confine the flow of fluid in the cooling chamber into helical paths defined by the dividing members, connecting means for connection with a source of cooling medium connecting through the second tube into the upper portion of said cooling chamber, said second tube having an outlet on the opposite side from the connecting means.

2. A testing device including a first hollow tube having a lower closed end adapted to receive a thermostatic element and a temperature measuring device, a second hollow tube having a lower closed end surrounding but spaced from the first tube to form a cooling chamber therebetween, substantially diametrically opposite dividing members located in said cooling chamber extending substantially the entire distance between said tubes substantially from the top to the bottom thereof to form two passageways from the top to the bottom of the cooling chamber, connecting means for connection with a source of cooling medium connecting through the second tube into the upper portion of one of the passageways in said cooling chamber, the upper portion of said second tube also having an outlet located on another side and communicating with the upper portion of the other passageway in the cooling chamber.

LONZO S. COOPER.

REFERENCES CITED

The following references are of record in the file of this patent:

UNITED STATES PATENTS

| Number | Name | Date |
|---|---|---|
| 2,026,079 | White et al. | Dec. 31, 1935 |
| 2,299,867 | Wolfson | Oct. 27, 1942 |
| 2,383,756 | Williams | Aug. 28, 1945 |

FOREIGN PATENTS

| Number | Country | Date |
|---|---|---|
| 64,735 | Switzerland | Mar. 18, 1913 |